Figure 1:
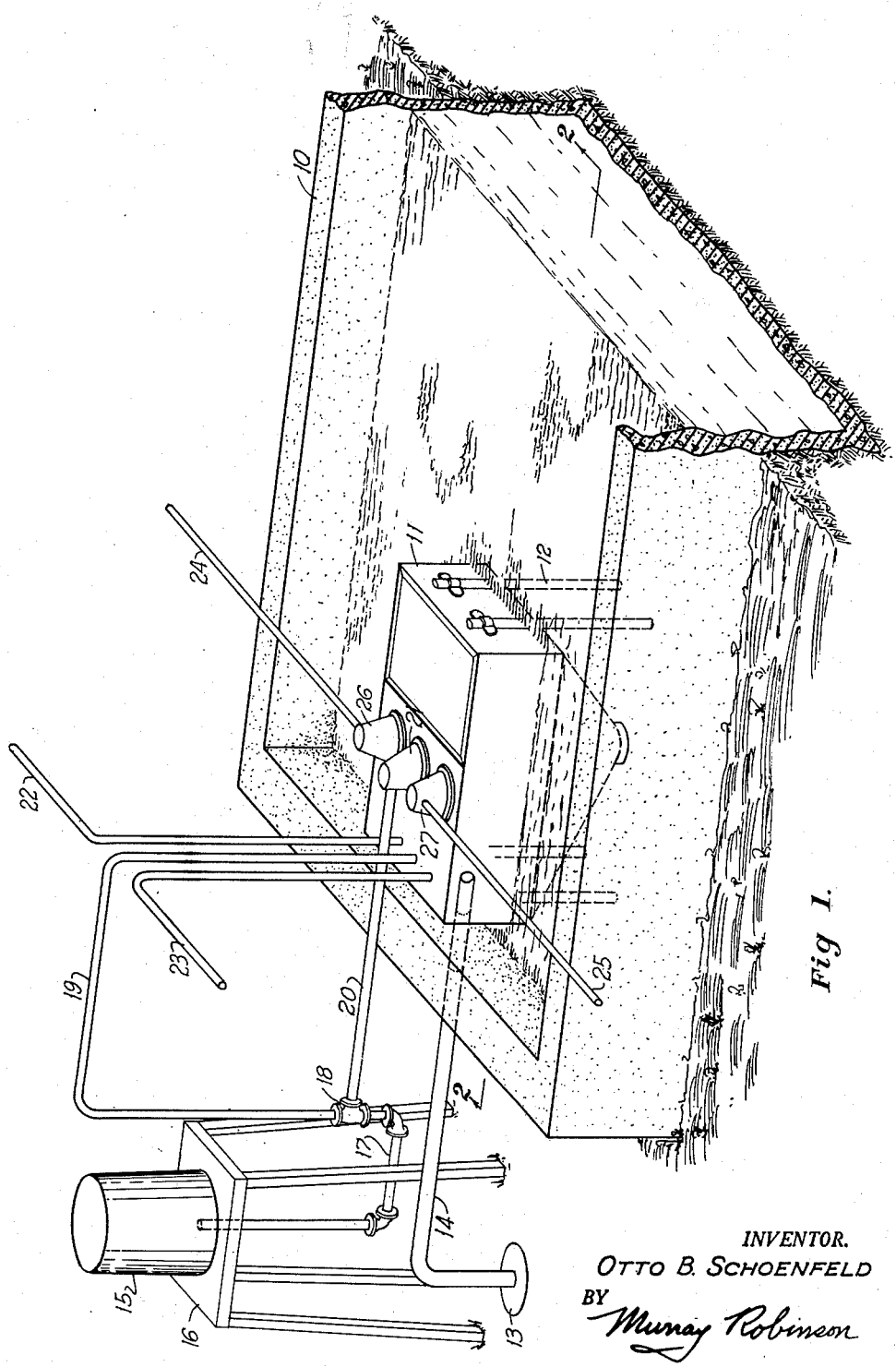

May 18, 1954

O. B. SCHOENFELD 2,678,917

LIQUID TREATMENT APPARATUS

Filed Jan. 20, 1948

2 Sheets-Sheet 1

INVENTOR.
OTTO B. SCHOENFELD
BY Murray Robinson
ATTORNEY

May 18, 1954
O. B. SCHOENFELD
2,678,917
LIQUID TREATMENT APPARATUS
Filed Jan. 20, 1948
2 Sheets-Sheet 2
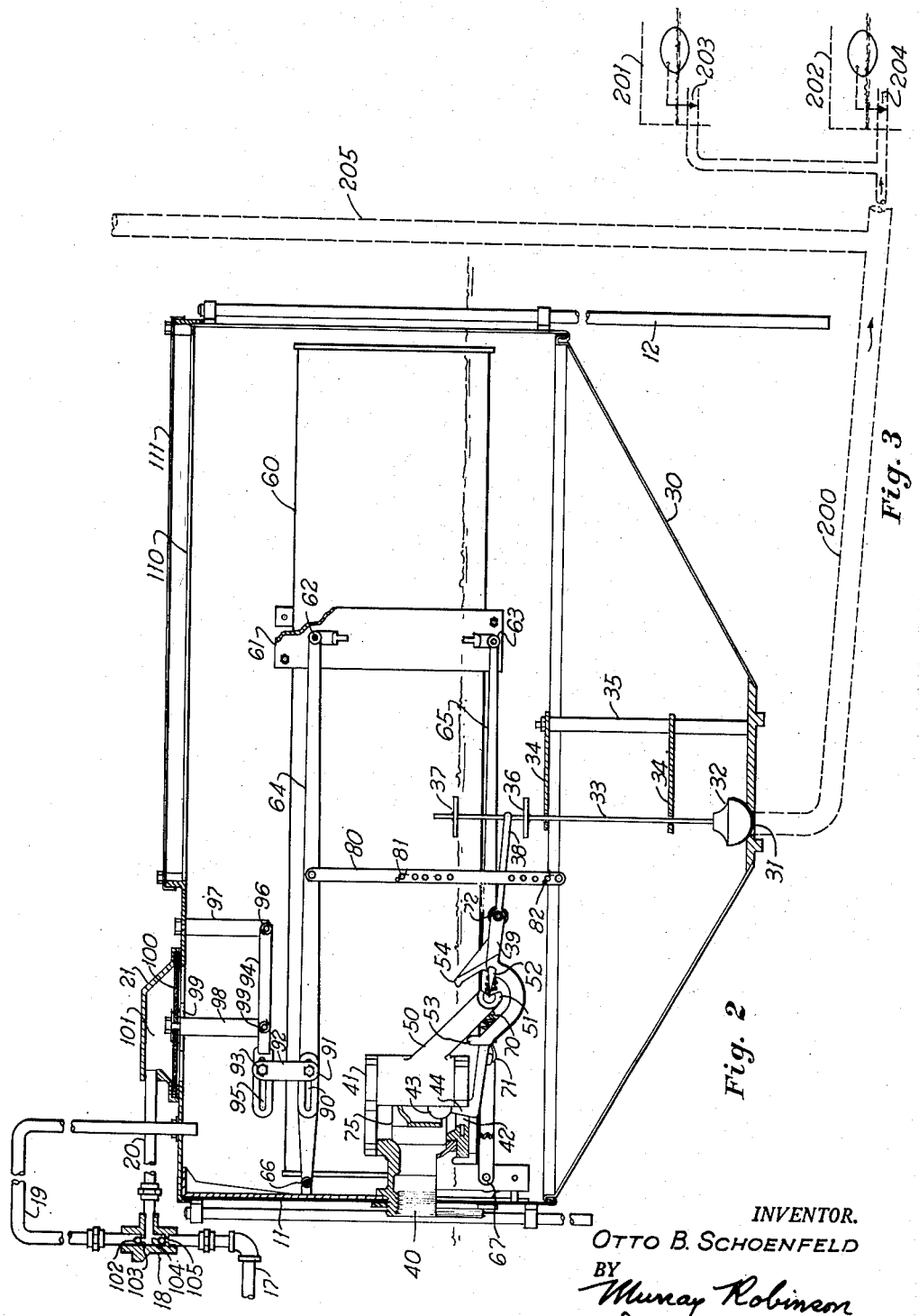
INVENTOR.
OTTO B. SCHOENFELD
BY
Murray Robinson
ATTORNEY Patented May 18, 1954

2,678,917

UNITED STATES PATENT OFFICE 2,678,917

LIQUID TREATMENT APPARATUS

Otto B. Schoenfeld, Houston, Tex.

Application January 20, 1948, Serial No. 3,348

15 Claims. (Cl. 210—22)

This invention pertains to a method of treating and supplying water, and to apparatus for carrying out the method. More particularly it pertains to the addition of mineral supplement to the drinking water provided for animals such as cattle and other livestock and to an automatic device therefor. The purpose of the invention is to treat water received from an ordinary source such as a well, by adding preselected materials thereto, to make the resulting fluid homogeneous, and to deliver the treated water to a drinking basin in such volume as to maintain the level of water in the hole within predetermined limits.

The principal object of the invention is to provide an improved method and an improved apparatus for accomplishing the aforementioned purpose.

It is a further object of the invention to make possible the utilization of a source of water that has a low pressure.

A further object of the invention is to make possible the utilization of a source of water that contains sand or is contaminated with other material that will settle out.

Another object of the invention is to provide apparatus for accomplishing the above stated purposes that will be almost wholly automatic, requiring no attention from the operator other than periodical filling of the storage containers and an occasional cleaning of the mixing tank.

A further object of the invention is to provide such an apparatus that will not freeze up due to precipitates or other matter accumulating on the moving parts.

Still another object of the invention is to provide an apparatus which will be extremely accurate in its proportioning of the material added to the water.

Another object of the invention is to provide an apparatus which will be entirely safe to use and which cannot, through faulty operation, become harmful to the animals.

Another object of the invention is to insure complete homogeneity of the drinking water at all times so that there will be no possibility of any livestock drinking water having too high a concentration of treating material.

Other objects of the invention are to provide an apparatus that is inexpensive to manufacture, economical, reliable, and simple to operate, and which will be strong and durable with a minimum of maintenance and repair.

Additional objects of the invention will become apparent from the following description thereof.

Briefly stated the method and apparatus according to the invention comprise a drinking basin and a mixing tank. There is a valve controlled outlet in the bottom of the tank through which the tank and basin are placed in communication, either by placing the tank in the basin or connecting the outlet to the basin with a pipe. The tank is also connected through a valve controlled inlet to a source of water. A float within the tank is connected to a snap action mechanism for operating the two valves. The float is also connected to a pump drawing treating material into the mixing tank from a storage container. When the water level in the mixing tank falls the float moves downwardly actuating the pump to draw treating material out of the storage container into the pump. At a predetermined level the snap action mechanism trips, closing the outlet valve and opening the inlet valve. The water level then rises in the tank and the float rises with it, actuating the pump to discharge the treating material into the tank. When the water level rises to another predetermined level the snap action mechanism again trips, closing the inlet valve and opening the outlet valve.

In this manner definite proportions of water and treating fluid are admitted to the mixing tank and the tank is then placed in communication with the drinking basin through the bottom outlet. The water in the tank and the basin will come to the same level through a partial emptying of the tank. The filling and emptying of the tank effects a homogenization so that the treated water in the basin is of uniform constitution. After the water levels have equalized within and without the tank, the float is responsive to the common level so that it will fall whenever the level of the water in the basin drops and at a predetermined level of water in the basin the apparatus will again be actuated to admit additional treating water to the hole.

It is to be noted that although the apparatus is actuated initially in response to the water level in the basin, its final shut-off is in response to the water level in the tank, and that the water and treating materials making up the treated water are not dumped raw into the drinking basin but are first homogenized by mixing on entering and leaving the tank.

According to a modification, an additional valve may be provided in the inlet to the basin controlled by a float in the basin. The water level in the basin can then be maintained lower than that in the tank and liquid admitted from the tank only when the level in the basin is sufficiently low and shut off when it is sufficiently high. Due to the difference between the levels required to open and close the basin inlet valve, usually a whole tankful of water at a time will be admitted to the basin and in between times the tank will shut off from the basin, giving time for the fluid therein to become thoroughly homogeneous.

For a detailed description of a preferred embodiment of the invention and certain modifications thereof reference will now be made to the accompanying drawings in which Figure 1 is a perspective view of a complete apparatus according to the invention for performing the method thereof;

Figure 2 is a vertical section through the center of the mixing tank on the line 2—2 of Figure 1, some of the parts in the tank being shown in elevation; and Figure 3 is a schematic representation of how the single mixing tank of Figure 2 may be used with a plurality of separate drinking basins at different levels from that of the tank.

Referring to Figure 1 there is shown a concrete drinking basin 10 set with its bottom partially below the level of the ground. Within the basin 10 there is placed a mixing tank 11 which is adjustably clamped to supporting legs such as that shown at 12 so that the bottom of the tank is spaced from the bottom of the basin and so that the height of the tank can be adjusted. A source of water such as a well 13 is connected by a pipe 14 to the tank 11. The pipe 14 may pass through the sidewall of basin 10 in cases where the water pressure is low. Disposed near the drinking basin are one or more storage barrels or other containers such as that shown at 15. The barrels are supported on raised platforms such as that shown at 16, the height of the platform being such that the bottom of the barrel is higher than the top of the mixing tank 11. The bottom of the barrel is connected to pipe 17 which in turn is connected through valve 18 to a discharge pipe 19 opening into the top of tank 11. The discharge pipe 19 is of inverted U shape and the highest point of the pipe is above the level of the top of barrel 15. Valve 18 is also connected by pipe 20 to a diaphram pump 21. In like manner the other barrels not shown are connected by pipes 22 and 23 to the top of tank 11 and by pipes 24 and 25 to diaphragm pumps 26 and 27.

Referring to Figure 2 there is shown the internal construction of tank 11. The sidewalls of the tank may have any desired section. They are shown disposed in the shape of a square in Figure 1 but could equally well be cylindrical. It is important, however, that the bottom 30 of the tank be inclined. As shown the bottom 30 is in the form of a truncated pyramid. At the lowermost point in the bottom of the tank there is an opening 31. The opening 31 is controlled by a valve 32 supported on a stem 33 moving in guides 34 supported on bracket 35. The stem is provided with flanges 36 and 37 which cooperate with fork 38 on the end of floating lever 39 to raise and lower the valve stem 33 thereby opening and closing the valve.

In one side of the tank 11 there is an opening 40 to which the water inlet pipe 14 connects. On the inside of the tank 11 a valve housing 41 is also connected to the opening 40. An opening 42 in the bottom of the valve housing is controlled by a ball valve 43 which is actuated to open position by a pin 44 on the end of float lever 39.

The housing 41 carries an arm 50, the end of which is formed in the shape of a saddle 51. A knife edge 52 on the lever 39 normally rests in the saddle 51, the knife edge and saddle serving as a pivot point. The lever 39 is provided with horn stops 53 and 54 to limit the arc of travel of lever 39 in its pivotal movement.

Disposed within the tank 11 is a float device comprising one or more float tanks such as that shown at 60. The tanks are connected together by straps 61 which in turn are pivotally connected at 62 and 63 to guide links 64 and 65. The guide links are pivotally connected to tank 11 at 66 and 67. A tension spring 70 is connected at 71 to guide links 65 and 72 to lever 39. The spring 70, guide link 65, lever 39, and arm 50, together, form the principal parts of a snap action device. Motion of the guide link 65 in a vertical plane will cause vertical motion of point 71 connecting the guide to one end of the tension spring 70. Whenever the axis of the spring is moved from one side of the pivot point formed by knife edge 52 and saddle 51, to the other side of this pivot point the lever 39 will be acted upon by the spring to pivot until one of the stops 53 or 54 abuts against the arm 50. In the position of the arm shown in the drawing the pin 44 is in its uppermost position in which the ball valve 43 is lifted off its seat opening the passage 42 so that water may flow into the mixing tank through opening 40. Also the fork 38 on the other end of lever 39 is in its lowermost position in which the valve 32 is driven down to close the opening 31 in the bottom of tank 11. When the lever 39 is in its other rest position with horn stop 54 abutting against arm 50 the ball valve 43 is closed and the valve 32 will be open.

It is to be noted that ball valve 43 closes under the action of gravity. To insure that the valve will not be prevented from closing on account of turbulence caused by water entering through opening 40 a cylindrical shield 75 is provided around the opening 42 and ball valve 43. Water entering through the top of the shield will flow axially thereof thus tending to assist gravity in closing the ball valve 43. Likewise, valve 32 is closed by gravity but due to the resistance of the water which will tend to slow the downward travel of the valve, the valve will be aided initially in its downward movement by the action of fork 38 against flange 36.

It sometimes occurs that solids will precipitate out of the water in the tank 11 around the pivot point of the lever 39, however, due to the floating mounting this would merely tend to move the knife edge away from the saddle and immediately thereafter the spring would cause the knife edge to chip away any such precipitated material. In other words, the pivot for lever 39 is self-cleaning.

As a further safety feature to care for the possibility of lever 39 becoming frozen in some manner there is provided a supporting frame 80 connected between the guide links 64 and 65. The sides of the frame 80 are provided with a number of holes within any two of which are disposed upper and lower bars 81 and 82. These bars are disposed in proper locations so that if, after the float has moved to a position in which the floating lever 39 normally would be actuated and has not in fact, been actuated the adjacent one of the two bars 81 and 82 would be brought into contact with the lever 39 and positively actuate it.

The upper guide link 64 is provided with a slot 90 within which is adjustably disposed a pivot 91 for a link 92. The upper end of link 92 is connected by a pivot 93 to a link 94; the pivot 93 being adjustably disposed within a slot 95 in the end of link 94. Link 94 is pivotally connected at 96 to bracket 97 connected to the under side of the top of the tank 11. A link 98 is pivotally connected at 99 to link 94. The upper end of link 98 passes through a hole 99 in the top of tank 11, and connects to the center of a flexible diaphragm 100. The diaphragm 100 forms one wall of the pump chamber 101 of pump 21 to which the pipe 20 is connected. The pipe 20 as previously stated, is connected to the valve 18 which comprises an upper valve ball 102 and valve seat 103 and a lower valve ball 104 and valve seat 105. Ball 102 and seat 103 form a check valve permitting flow through pipe 19 only in the direction toward tank 11. Ball 104 and seat 105 form a check valve permitting flow through pipe 17 only in the direction away from storage barrel 15 toward pump chamber 101 and tank 11.

Upon downward movement of the float device within the tank 11 the diaphragm 100 will be moved in a direction to enlarge pump chamber 101 thereby drawing fluid from the storage barrel 15 into the pump chamber. Upward movement of the float device will move the diaphragm 100 upwardly to reduce the volume of pump chamber 101 thereby expelling fluid into the pipe 19 and the tank 11. The top of pipe 19 is disposed above the level of barrel 15 so that a positive pumping action is required to deliver fluid from the barrel to the tank 11. Hence there is no danger of a free, uncontrolled flow of fluid from the storage barrel to the mixing tank. If the barrel were disposed at a level above the highest point of pipe 19 it would, of course, be possible to substitute a simple flow valve for pump chamber 101 and valve 18 and allow the float device to control the flow valve, however, in this case, should the flow valve become stuck in its open position for any reason such as the accumulation of solid precipitates then the entire contents of the storage barrel would immediately empty into the mixing tank. This is a serious problem where, as in the present case, the storage barrel 15 and the system connected thereto, are used to feed a nearly saturated salt solution to the tank 11.

The change in volume of the pump chamber 101 upon a given movement of the float device can be varied by adjusting the positions of the pivots 91 and 93. In this manner the proportion of treating material added to the water in the mixing tank in each operation can be accurately regulated to the desired value.

Where a plurality of sources of treating material are used, there will be a corresponding number of pumps as shown in Figure 1, each of which may be connected to the float device and actuated thereby in a manner similar to that described for pump 21. For example, additional links similar to links 64 and 65 may be installed at either side of the float device and connected to the diaphragm of the various pump chambers so as to provide for independent adjustment of the stroke of each pump. In lieu of the rigid mechanical connection shown it would also be possible to provide for the actuation of the pumps by other means such as a hydraulic system or a system utilizing wires operating in flexible conduits. The latter types of systems may be advantageously used where a large number of separate sources of treating material are used. All such actuating means between the float device and pumps are referred to in the claims hereof as "connections," the term being used in its broadest sense. The same holds true elsewhere that the term "connection" is used.

Tank 11 is provided with a large opening 110 closed by a removable cover 111 so that easy access to the interior of the tank may be had for minor adjustment and repair of the mechanism therein.

It is to be noted that the tank described in the foregoing paragraphs is arranged to make possible the use of a water supply having a low head. It is characteristic of many artesian wells that though the rate of flow may be high, the water will rise under its own pressure only a few feet above the ground. This means that the difference between the high and low levels in the mixing tank available for moving the float and operating the valves and pump is not great. Most float operated devices utilize relatively small floats which act at the end of a long lever to achieve the necessary operating force and rely on a large rise and fall to obtain the necessary movement at the short end of the lever. According to the present invention, the floats are very large and extend over almost the entire area of the tank. The outlet valve is below the floats and the pump above them and the inlet valve is placed between the floats so as not to interfere with their rise and fall. Since large floats are used a large operating force is obtained with a relatively small leverage so that the necessary rise and fall is not great. Also, in accordance with the invention, the water inlet and inlet valve are disposed at a level which is not above the high water level and which is not below the low water level so that maximum use is made of the available head.

In operation of the system described above desired mineral salts are dissolved in water and placed in one or more barrels 15. Usually only one barrel will be needed but the invention contemplates the use of more than one storage barrel in cases where the various mineral salts or other water treating materials would react with one another if mixed together in saturated solutions or in which mixture thereof would for some other reason be undesirable. If necessary the pipes connected to the diaphragm pumps are primed by filling them with liquid. Then, after the apparatus has been installed, as the level of water in drinking basin 10 is lowered by livestock drinking therefrom the float device in the tank 11 will fall. This will draw treating solution from the various storage barrels into the diaphragm pumps. When the level in the basin reaches a predetermined point the float will have fallen to such a point as to trip the snap action device in the tank 11. This will close the valve in the bottom of tank 11 and open the valve in the water inlet line. Then as the water fills up the tank 11 the float device will rise, causing the diaphragm pumps to force water treating material into the tank. The circulation of the water caused by the flow in from the water inlet will cause the water to be mixed with the various water treating materials. When the combined level of the water and treating materials reaches another predetermined point in the tank 11 the float device will cause the snap action device to be tripped in the other direction, thus closing the water inlet and opening the outlet in the bottom of the tank 11. The fluid level in the tank 11 will immediately start to fall in order to equalize with that in the basin 10 so that further action of the diaphragm pump to discharge treating material into the tank 11 will be stopped. The fluid will not be completely discharged from tank 11 but will only be sufficiently discharged so that the level within and without the tank is equal. As the fluid leaves the tank 11 through the outlet in the bottom there will be further agitation of the fluid tending to make the mixture of the water and treating material more nearly perfect so that the fluid entering the basin 10 will be nearly homogeneous. Any heavy solid material, however, such as sand entering through the water inlet, which settles to the bottom of tank 11 will be drawn by the action of gravity down the inclined sides of the bottom and washed out through the outlet in the bottom of the tank so that there will not be any accumulation of this material inside the tank sufficient to interfere with the operation of the apparatus. Such heavy solid matter will sink to the bottom of the drinking basin so that the treated water available in the top thereof for drinking will be perfectly clear.

In the embodiment of the invention described in Figures 1 and 2, the mixing tank is located inside the drinking basin which may be considered the preferred arrangement where the pressure of the water supply is low since it permits placing the tank at a low level partly below the surface of the ground without any separate excavation for the tank. However, the tank can also be placed outside the basin and connected thereto by a suitable pipe and by means of branch pipes can be connected to supply a plurality of drinking basins. Furthermore, it is not necessary that the tank be so located as to permit equal water levels in the tank and basin for by providing a valve in the inlet to the basin and a float or other device responsive to the level of the water in the basin to control the valve, the water level in the basin can be continuously maintained below the level of the water in the tank. Such modifications are shown in Figure 3.

Figure 3 shows how the opening 31 in the bottom of the tank shown in Figure 2 may be connected by a pipe 200 and branch pipes to one or more separate drinking basins indicated at 201 and 202. The inlets to the basins 201 and 202 are illustrated as having float controlled inlet valves 203 and 204, it being assumed that both of the basins are at levels below the tank 11. An open topped standpipe 205 may be connected to the upper end of pipe 200 so as to maintain atmospheric pressure below valve 32 which might otherwise be prevented from opening due to the difference between the pressure above and below the valve. Such a standpipe will usually be necessary where the total drop in pipe 200 is great, for the reduction in pressure below the valve would be directly proportional to the height of the water column between the tank outlet valve and the basin inlet valve up to about thirty-two feet, after which the water column would break leaving a vacuum below the valve. Using a standpipe, the water would leave the bottom of the valve as soon as the standpipe emptied and thereafter air at atmospheric pressure would be admitted below the valve. The bottom end of the standpipe should be connected as closely as possible to the outlet valve 32 so there will not be much water in the pipe 200 between them since this water must flow beyond the bottom end of the standpipe before it opens the bottom valve to atmosphere.

The operation of the system utilizing an inlet valve for each basin is substantially the same as that where the tank is mounted in the basin or is connected to the basin by a pipe that is not valve controlled. Although in the system using a valve controlled inlet for the basin the tank is not normally in communication with the basin, the outlet valve of the tank is normally open and whenever the level in the basin falls water is admitted from the tank. In other words, about the only effects of the basin inlet valve are to normally create a difference between the water levels in the tank and basin and to prevent diffusion therebetween when the basin valve is closed.

While a preferred embodiment of the invention and certain variations thereof have been shown and described, it is obvious that many modifications thereof could be made and the invention put to a variety of uses without departing from the spirit of the invention. Thus, the inlet of the tank can be connected to the outlet of a septic tank and the pump used to add chlorine to the septic tank discharge. The outlet of the tank may be connected to a lag basin or directly to a sewer channel so that the fluid level in the outlet line is always below that in the tank. This is a very easy way to solve the problem of chlorinating the discharge of a septic tank which is usually located a considerable distance from any source of power. Here the head of the discharge alone furnishes the motivating force.

It is intended to protect by Letters Patent all forms of the invention falling within the scope of the appended claims.

I claim:

1. In combination, a tank having a liquid inlet and a liquid outlet, a valve controlling the liquid inlet, a valve controlling the liquid outlet, a float in the tank, a linkage connected to the tank and to the float to guide the float in its rise and fall with the liquid level in the tank, a snap action device, a linkage connecting the float to the snap action device, said snap action device comprising a pivotally mounted lever and a spring connected to said lever and said linkage, said valves being connected to said lever to be operated with a snap action according to the liquid level in the tank, and stops on the linkage adapted in extreme positions thereof to engage the lever to positively move same in case the spring fails to do so.

2. In combination, a tank having a liquid inlet and a liquid outlet, a valve controlling the liquid inlet, a valve controlling the liquid outlet, a float in the tank, a linkage connected to the tank and to the float to guide the float in its rise and fall with the liquid level in the tank, a snap action device, a linkage connecting the float to the snap action device, said valves being connected to said snap action device to be operated thereby according to the liquid level in the tank, and additional mechanism connected to the float and the valves to positively actuate the valves in case the snap action device fails to operate.

3. In combination, a tank having an inlet and an outlet, a valve controlling the inlet, a valve controlling the outlet, a pump discharging into the tank, means including a float rising and falling with the level of liquid in the tank, means connecting the float to the inlet valve to open the inlet valve at a lower liquid level and to close the inlet valve at a higher liquid level, means connecting the float means to the outlet valve to open the outlet valve at said higher level and to close the outlet valve at said lower level, and means connecting said float means to said pump to cause it to intake during the fall of the liquid level in the tank and to discharge during the rise of the liquid level in the tank.

4. The combination of claim 3 in which the means connecting the float means and the pump includes adjustable means to vary the length of the pump stroke for a given change in the level of the liquid in the tank.

5. The combination of claim 3 in which the pump comprises a variable volume chamber having a movable wall, said movable wall comprising a flexible member fixed at its extremities to said chamber in liquid tight relationship, and valve controlled inlet and outlet to said chamber.

6. In combination with the apparatus of claim 3, a container above said tank, and a flow connection from said container to said tank including a part at a higher level than the top of said container, said pump being connected to said flow connection to intake from said container and discharge through said part.

7. In combination with the apparatus of claim 3 a plurality of basins disposed at lower levels than said tank, liquid conducting means connecting said tank outlet with each of said basins, each of said basins having a valve controlling the connection of the last said means thereto and a float therein controlling the opening and closing of the last said valve, and a standpipe connecting the last said means to atmosphere at a level above said tank.

8. In combination, a tank having an inlet and an outlet, a valve controlling the inlet, a valve controlling the outlet, a pump discharging into the tank, means including a float rising and falling with the level of liquid in the tank, a snap action device, means connecting the float means with the snap action device to move the device to one extreme position at a lower level of liquid in the tank and to another extreme position at a higher level of liquid in the tank, means connecting the snap action device to the inlet valve to open it in one of said positions and close it in the other position, means connecting the snap action device to the outlet valve to close it in one of said positions and to open it in the other position, and means connecting said float means to said pump to cause it to intake during the fall of liquid level in the tank and to discharge during the rise of the liquid level in the tank.

9. The combination of claim 8 in which said snap action device comprises a lever, means pivotally mounting said lever in said tank, said mounting means comprising knife edge and saddle elements, one of said elements being fixed on said lever and the other fixed on said tank, stops to limit the pivotal movement of said lever on said tank to motion between said extreme positions, a tension spring connected at one point to said float device and at another point to said lever, the axis of said spring lying on one side of the pivot center of said knife edge and saddle elements in one of said extreme positions of the snap action device and lying on the other side of said center in the other extreme position of said snap action device.

10. The combination of claim 8 in which said inlet comprises an opening in a horizontal wall, the space beneath the opening communicating with the interior of the tank; and the inlet valve comprises a circular seat around said opening and a spherical ball above said opening resting on said seat when the valve is closed; and the means connecting the snap action device to the inlet valve includes a pin which when the valve is open extends up through said opening and contacts said ball holding the ball off said seat.

11. The combination of claim 10 with means including a liquid guide wall around the seat and ball above the opening to cause liquid moving through the valve to pass over the ball in a direction tending to close the valve.

12. In combination, a basin having no liquid outlet but open at its top to expose the liquid therein to cattle drinking therefrom, a tank having an inlet and an outlet, said outlet being in communication with the interior of said basin, means including a float rising and falling with the level of liquid in the tank, a snap action device, valves controlling said inlet and outlet, means connecting said snap action device to said float means and said valves to fully open said inlet and fully close said outlet at a lower level of liquid in said tank, said lower level being above said outlet and below the top of said basin, and to fully close said inlet and fully open said outlet at a higher level of liquid in said tank, the capacity of said basin to hold additional liquid above said lower level without overflowing being greater than the capacity of said tank between said levels, a pump connected to discharge into said tank, and means connecting said float means to the pump to actuate the pump to intake during fall of the liquid level in said tank and to discharge during rise of the liquid level in said tank.

13. In combination, means to contain a body of liquid, an inlet to said containing means, a valve controlling said inlet, a pump discharging into said containing means, a float rising and falling with the level of liquid in said containing means, a snap action device, means connecting the float with the snap action device to move the device to one extreme position at a lower level of liquid in the containing means and to another extreme position at a higher level of liquid in the containing means, means connecting the snap action device to the inlet valve to open it in said one of said positions and close it in the other position, and means connecting said float to said pump to cause it to intake during the fall of liquid level in said containing means and to discharge during the rise of liquid level in said containing means.

14. Apparatus for adding a treating material in liquid form to another liquid body comprising a float adapted to rise and fall with the surface level of such a liquid body, a variable volume chamber including a body portion and a movable flexible wall having its peripheral edge fixed to said body portion in fluid tight relationship, an inlet to said chamber, a check valve in the inlet preventing outflow through the inlet, an outlet from the chamber, a check valve in the outlet preventing inflow through the outlet, and means connecting said float to said movable wall to move said wall outwardly to increase the volume of said chamber upon fall of said float with said surface level and to move said wall inwardly to decrease the volume of said chamber upon rise of said float with said surface level, whereby when said inlet of said apparatus is connected to a storage chamber containing treating material and said float is placed in such a body of liquid the apparatus will pump treating material into said body of liquid as the surface level thereof rises.

15. In apparatus for controlling the flow of liquid into a container therefor including a valve placed in a liquid line leading to the container, a float placed in the container to float on the surface of the liquid therein, a lever, means connecting the float to the lever, means on the lever for operating the valve, a fixed support, means adjacent the float pivotally mounting said lever on said support, stops to limit the pivotal movement of said lever on said support to motion between two extreme positions, and biasing means to urge said lever to the one of said extreme positions to which it is nearest at any given moment, the improvement according to which said mounting includes knife edge and saddle elements, one of said elements being disposed on the lever and the other on said support, and said biasing means includes a tension spring, means connecting one point of said spring to said float, and means connecting another point of said spring to said lever, the axis of said spring lying on one side of the pivot center of said pivotal mounting means in one of said extreme positions and on the other side of said center in the other of said extreme positions, said spring at all times exerting a force on said lever having at least a component directed from said knife edge toward said saddle to yieldably hold said elements in engagement, whereby accumulation of deposits from said liquid upon said pivotal mounting sufficient to freeze said pivotal mounting will tend to be prevented by the grinding and chipping action of said knife edge upon said saddle.

References Cited in the file of this patent

UNITED STATES PATENTS

| Number | Name | Date |
|---|---|---|
| 127,240 | Howe | May 28, 1872 |
| 258,699 | Blackman | May 30, 1882 |
| 654,441 | Cook | July 24, 1900 |
| 777,119 | Marshall | Dec. 13, 1904 |
| 926,843 | Bartlett | July 6, 1909 |
| 1,264,939 | Jay | May 7, 1918 |
| 1,434,574 | Walter | Nov. 7, 1922 |
| 1,461,992 | Weber | July 17, 1923 |
| 1,492,878 | Eklundh | May 6, 1924 |
| 1,529,566 | Aikman | Mar. 10, 1925 |
| 1,592,707 | Rippingille | July 13, 1926 |
| 1,608,878 | Hanson | Nov. 30, 1926 |
| 1,680,103 | Hardy | Aug. 7, 1928 |
| 1,681,157 | Eggleston | Aug. 14, 1928 |
| 1,968,114 | Windecker | July 31, 1934 |
| 2,019,461 | Russell | Oct. 29, 1935 |
| 2,144,345 | Schlecker | Jan. 17, 1939 |
| 2,196,908 | Bachman | Apr. 9, 1940 |
| 2,304,850 | Rice | Dec. 15, 1942 |
| 2,322,689 | Goetz | June 22, 1943 |
| 2,355,561 | Robinson | Aug. 8, 1944 |
| 2,366,808 | Schultz | Jan. 9, 1945 |
| 2,525,014 | Berge | Oct. 10, 1950 |

FOREIGN PATENTS

| Number | Country | Date |
|---|---|---|
| 651,937 | Germany | Oct. 22, 1937 |